July 20, 1948.  W. A. BOHANNON  2,445,417
AIRCRAFT POWER PLANT STRUCTURE
Filed Sept. 30, 1943  2 Sheets-Sheet 1
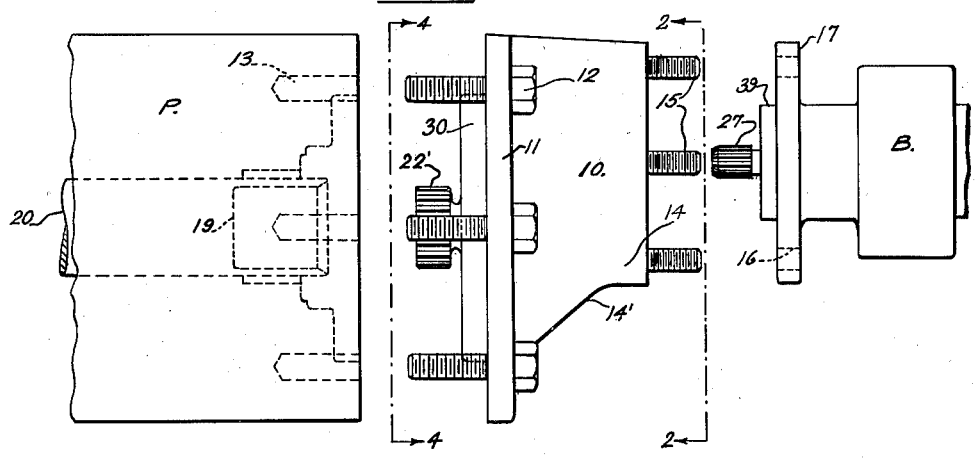
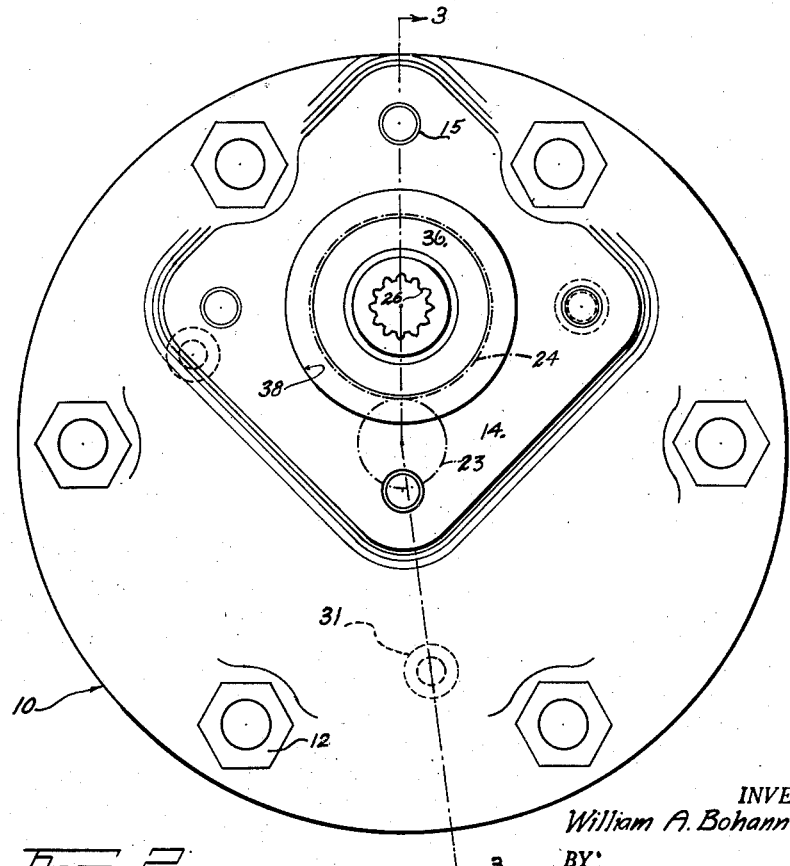
INVENTOR:
William A. Bohannon;
BY:
Robert C. Rasche,
ATTORNEY.

July 20, 1948. W. A. BOHANNON 2,445,417
AIRCRAFT POWER PLANT STRUCTURE
Filed Sept. 30, 1943 2 Sheets-Sheet 2

INVENTOR:
William A. Bohannon;
BY:
Robert C. Rasche,
ATTORNEY.

Patented July 20, 1948

2,445,417

UNITED STATES PATENT OFFICE 2,445,417

AIRCRAFT POWER PLANT STRUCTURE

William A. Bohannon, Uniondale, N. Y., assignor to Republic Aviation Corporation, a corporation of Delaware Application September 30, 1943, Serial No. 504,476

12 Claims. (Cl. 74—11)

This invention is concerned with aircraft of the type in which it is found desirable to employ accessory mechanisms for the purpose of supplying auxiliary pressure, fluid-flow, electric current, etc., to various stations of the aircraft which desideratum usually necessitates a separate power-source in addition to the internal combustion engine or other prime mover of the aircraft to actuate the accessory.

Broadly considered, the invention aims to provide an improved solution of the problem of effectuating the operation of an aircraft auxiliary mechanism, such as a pump, generator or similar rotary mechanism, and to do so in such a manner as to obviate the prevalent necessity for the employment of an additional source of power, such as a battery, auxiliary airscrew, etc., for operating the accessory.

To this end, the invention contemplates an improved diversion and utilization of a part of the power generated by the prime mover itself of the aircraft.

More specifically, it is the aim and purpose of the invention to provide improved means to adapt any sort of aircraft engine that has a power take-off construction to rotate any kind or type of rotary accessory mechanism for supplying auxiliary pressure, current, etc., and without necessitating any change at all in the structure of either the engine or the accessory.

It is a specific object of the invention to provide a unitary article of manufacture which will constitute a standardized but interchangeable connector and adapter for enabling the ready driving attachment of any accessory to any engine and which will, at the same time, be a self-contained, yet interchangeable, universally usable power transmission device in which the transmission members will be pre-aligned with both the power-applier and the power receiver, regardless of the specific nature of either, whereby to adapt a standard aircraft engine to drive a wide range of non-standard accessories, either with or without altering the power and speed transmission ratio and rate.

A further specific object of the invention is to provide an article of this dual nature which will nonetheless have but the minimum number of parts—and hence be simple and easy to manufacture and install—yet be precise, dependable, and durable in service, withal.

A specific but noteworthy feature of the invention resides in the concept of providing, in the power-transmission zone of the present adapter-transmitter, of means whereby, when the torque-reaction of the driven-device or accessory on the engine reaches a magnitude in excess of a predetermined safe value, all driving-connection between the engine and the accessory will be terminated and discontinued, thus precluding the imposition of unwarranted drains or stresses upon the engine.

Another noteworthy feature of the present concept is found in the fact that the power-transmission components of the adapter-article are conceived to be entirely supported and journaled within the exact confines of the article itself, obviating the prevalent necessity for boring new attachment holes in the engine-pad and in the new accessory every time a different accessory is, as is usual, directly mounted on the power take-off of the engine.

The other aims, accomplishments and advantages of the invention will either be made manifest, or become apparent, as this disclosure progresses.

In order to render the nature and purposes of the invention clear in the manner required by the statutes, a certain optional embodiment thereof has been illustrated in the accompanying drawings and will be described in detail hereinafter, but it is to be understood that the invention, and the inventive concepts and essence, are limited in the forms and embodiments which they can take, only by the legal scope and extent of the subjoined claims.

In the aforementioned drawings,

Fig. 1 is an expanded elevational view—more or less schematic—showing, from left to right: one of the power take-off pads of a conventional aircraft engine; a novel structure embodying forth the present inventive concepts; and an aircraft accessory of optional type and size;

Fig. 2 is an enlarged end elevation, on line 2—2, of one of the articles shown in Fig. 1;

Figure 3:
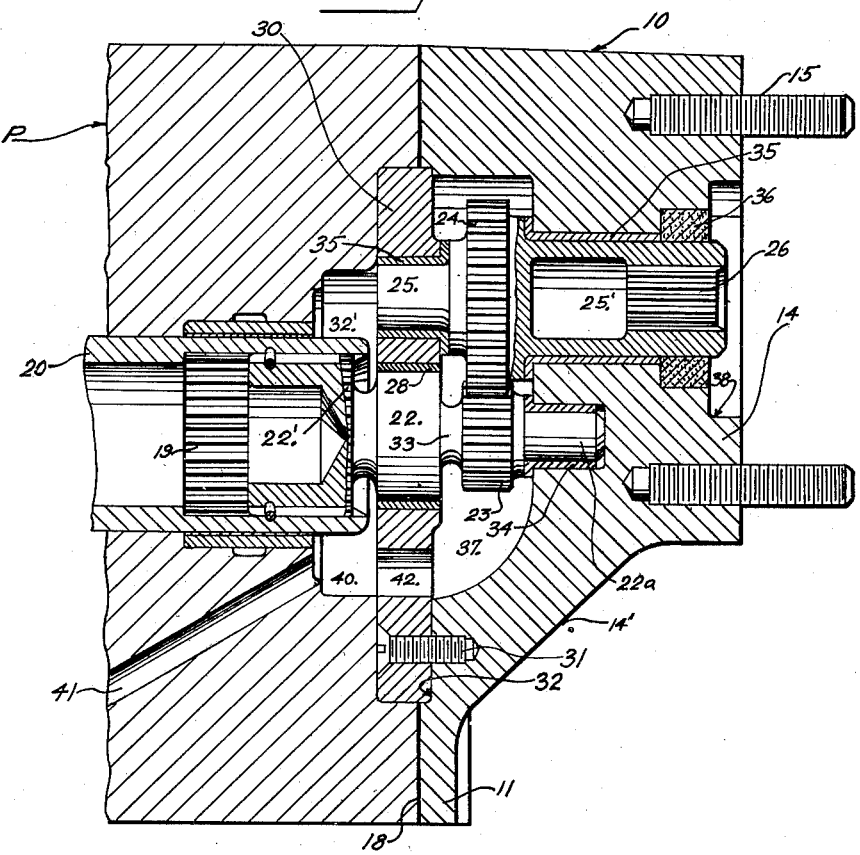
Fig. 3 is an enlarged, vertical, substantially central section of the same article on line 3—3 of Fig. 2.
Figure 4:
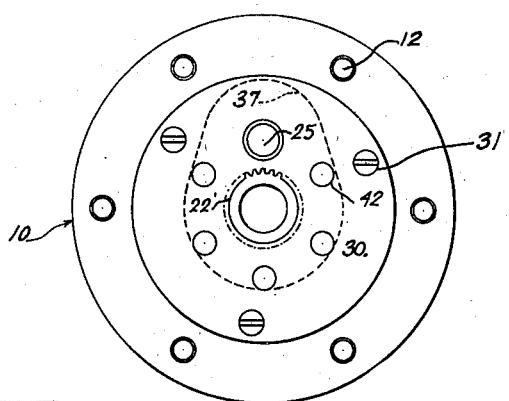
Fig. 4 is a true-scale end elevation of the same article on line 4—4 of Fig. 1.

As shown in Fig. 1, an aeronautical accessory, B, which can be of substantially any type and of any reasonable size and located in or near the power plant compartment of an aircraft and provided for the purpose of supplying auxiliary power, pressure, electrical current, fluid-flow or the like, to various stations in the aircraft, is adapted by the present invention to be quickly connected to, and utilize a portion of, the power generated by a conventional aircraft prime mover, without any structural alteration at all of the accessory or of the prime mover, if the latter has, as is usually the case, a conventional, standardized power take-off and pad, P.

As a consequence, the accessory can be employed without the usually concomitant necessity for employing an additional source of power, such as the usual added battery, auxiliary airscrew, or the like; and also without the usual liability of placing undue stresses or back forces upon the engine or upon any of its parts, yet adapted nonetheless to provide instant, non-lagging operation of almost any kind and size of accessory.

To this end, there is provided, intermediate the pad P and the accessory B, a unitary member consisting essentially of a kerfed block or embracing-plate, 10 having a kerf, or reentrant portion, 37, the open face of which is closed by a plate member 30. The plate is removably attached to the block 10 by suitable fastening means, such as the machine screws 31, and preferably engages same in a depression or socket 32 in such a manner that the major portion, axially, of the plate projects, as shown. The block 10 is flanged peripherally as shown at 11 in Figs. 1 and 3, and is provided with a circularly arranged series of fastening means, such as the stud-bolts 12, adapted to engage in tapped apertures 13, similarly arranged around the periphery of the pad P. The exposed face of this plate is so machined and finished as to enable it to fit oil tight, unaltered, in the unaltered oil plate recess 32' of the standard power take-off pad of almost any type of aeronautical engine.

The remainder of the block 10, lying on the other side of flange 11, is gathered into the form of a flared or filleted boss 14—14', here shown as having substantially the shape of a truncated pyramid. The outermost or distal face of the boss is here shown, by way of example, as having the shape of a square with rounded corners, and is located somewhat above the horizontal center line of the block as a unit, and this, together with other factors hereinafter set forth, adapts same to register with and engage with the standard mounting flange, such as 17, of any standard aircraft accessory, if the latter is provided with threaded apertures 16 that are adapted to receive the studs 15.

At suitable points arranged suitably near the periphery of this boss, suitable fastening means, such as threaded coupling studs 15, are provided and these studs and this boss and face, being moreover, machined and finished in a particular manner, are thus adapted to receive or engage with substantially any kind and any reasonable size of rotary driven member or accessory.

In assembled position, the member 10 is bolted to the pad P, as shown in Fig. 3, and the accessory B is bolted to the remaining face of the member 10, a sealing-packing or gasket, 18, being interposed between the two around the periphery of the joint.

The drawings also show, especially in Figs. 1 and 3, the usual standard, power take-off driving shaft 20 now universally provided in aeronautical engines, which shaft is internally provided with splines 19. Projecting from the engine-side face of the plate, or septum, 30, of member 10, is a splined shaft 22 bearing external splines 22' adapted to mesh with the internal splines 19 in a number of axial positions. The other end of shaft 22 is formed into a spur-type driving gear or pinion 23, integral therewith. The central portion of shaft 22 is suitably mounted in a bushing 28. One face of member 23 has an integral extension in the form of a shaft 22a, which, being journaled in the suitable bushing 34 shown, is adapted to operate as a combined radial-and-thrust bearing for gear 23.

Vertically above shaft 22, and mounted at one end in the same plate 30, is another shaft 25 also journaled in a suitable bushing 35. Integral with this shaft 25 is a driven-type spur gear or pinion 24, located and arranged to be always in mesh with, and driven by, gear 23.

In the particular illustrative embodiment shown, the relative diameters of the gears, the pitch of the teeth and the ratio is such that a speed reduction is effectuated in the power transmission, but it is within the scope of the invention to, instead, effectuate a speed increase or power reduction in the transmission, if so desired.

The distal face of member 24 is integrally extended in the form of a hollow shaft 25' having internal splines 26 formed therein. Shaft 25 is suitably journaled at its ends in the bushings 35 and a suitable lubricant seal, 36, is provided around the exterior end of the shaft, in a depression 38, which depression is adapted to receive the usual standardized registration plate 39 of the mounting flange of the accessory. The accessory B, which can be of any widely varying type and size, is provided with a standardized splined shaft 27, projecting from the mounting flange 17 and meshable with the spline 26.

As shown in Fig. 3, the shaft 22, in the portion thereof that lies between the plate 30 and the gear 23, is constricted in diameter in such a manner, that although the shaft elsewhere is of exceptional strength, and is torque-resistant to a high degree, in this locality the shaft is rendered quite susceptible to torque reactions, and in fact, constitutes a shear-neck, 33. The shear-neck, 33, will yield and terminate the drive upon the torque resistance of the driven accessory B, reaching a magnitude in excess of a predetermined safe value, this feature and construction thus precluding the imposition of unwarranted stresses and back forces upon the power take-off shaft 20 and upon the engine itself.

An oil bath is provided between the plate 30 and the kerfed-block 10 and fills the power transmission chamber and the members 30 and 18 are adapted to prevent the escape of oil therefrom.

By virtue of the universal nature of the present article of manufacture, the standardized recess 40 usually found around the power shaft 20 of the take-off pad of aeronautical engines is left unobstructed when the present adapter is employed to adapt it to drive the present wide range of accessories, and is herein utilized as an oil bath chamber for the drive shaft 20. This bath is fed by the standard lubricating duct 41, usually found in these standardized pads and left unobstructed by the present invention. From chamber 40, oil or other lubricant passes through passageways 42, around the ends of the shafts 22 and 25, around bushings 28 and 29 and thence into the self-contained power transmission part of the block 10, at chamber 37, which it suitably fills and from which it is prevented from escaping by means of seals 18 and 36.

A noteworthy feature of the present invention resides in the construction, location and combination of parts whereby the power transmission elements of the invention are carried as a unit entirely within the confines of the member A, the gear-carrying shafts 22—25, being entirely supported at one end by the plate 30, and at the other, by the wall of the kerf 37. As a consequence, the prevalent necessity for additionally machining the conventional pad on aeronautical engines, as by boring shaft holes therein, and machining the accessory, as by boring corresponding shaft holes therein, in order to be able to obtain the usual direct connection between the accessory and the pad—different borings and different adjustments being necessary for each different type of accessory—is entirely eliminated. What is perhaps a more important feature of the invention, the necessity for taking the time and trouble and employing skill required in subsistent devices for making an accurate alignment of a direct-driven accessory and the standard power take-off drive is also obviated, and, as a consequence, the present permanently pre-aligned power-transmitter can be quite simply and quickly connected to the pad, whereby substantially any type and size of accessory is adapted to be employed with a standard, unaltered power take-off pad.

A minor feature of the invention that demonstrates well, however, the eminent adaptability of the present invention to meet and overcome widely varying circumstances, is the fact that the unit 10 can quite easily be mounted on a conventional engine pad with any portion thereof, say the flare 14', in any one of six different angular positions, merely by the choice of the desired one of the six bolts shown, the parts 29 and 19 still engaging in the manner shown in Fig. 3, regardless of the angular position of the member 10, and the driving relationship of the gear 23 to the gear 24 also remaining unchanged. Also, the member A may similarly be mounted in four different angular positions with respect to the accessory B, or vice versa, without affecting the driving connection 27 and 26 or the driving relationship of the members 24—25.

Having thus described the invention and disclosed the inventive concepts and the manner of embodying and constructing same and the principle of the machine and best known mode in which the principle is at present contemplated as being applied, all as required by the statutes, what is claimed as new and inventive is:

1. As a new article of manufacture, a unitary, interchangeable adapter for effectuating indirect drive of an auxiliary mechanism from a prime-mover having power take-off shafts; comprising a substantially open-face plate carrying a septum over the open-face, and a boss integral with the other face, the septum and plate defining and outlining a space therebetween containing a power-transmission device having a member for operationally engaging said power take-off and a member for operationally engaging the auxiliary mechanism, said first member projecting to the exterior through said plate and said second member projecting through said boss.

2. An article for adapting a standard, structurally-unaltered power take-off on an aeronautical engine to operate a standard, structurally unaltered aeronautical power-absorbing mechanism, comprising a housing formed at one face to fit over and around said take-off structure and permanently bearing positive fastening means protruding from said fitting face and adapted to retain said article on said engine, and permanently bearing positive fastening means protruding from the opposite face adapted to support said power-absorbing mechanism; a power receiving and transmitting member entirely supported in said housing and adapted at one end to engage the power shaft of said take-off, and a power applying member entirely supported in said housing and adapted to operatively engage said first member and adapted at the other end to drivingly engage said power absorbing mechanism, whereby to constitute said article a dual purpose adapter and self-contained power transmission device.

3. An article for adapting a standard, structurally-unaltered power take-off on an aeronautical engine to operate a standard, structurally-unaltered aeronautical power-absorbing mechanism, comprising a housing formed at one face to fit over and around said take-off structure and permanently bearing positive fastening means protruding from said fitting face and adapted to retain said article on said engine, and permanently bearing positive fastening means protruding from the opposite face adapted to support said power absorbing mechanism; a power receiving and transmitting member entirely supported in said housing and adapted at one end to engage the power shaft of said take-off, a power-applying member entirely supported in said housing and adapted to operatively engage said first member and adapted at the other end to drivingly engage said power absorbing mechanism, the power receiving and power applying members of said housing being respectively pre-aligned with reference to the drive shaft of the standard aeronautical engine power take-off and with the driven shaft of the conventional aeronautical power-absorbing mechanism, whereby to obviate the necessity for aligning the driven shaft of the power absorbing mechanism with the drive shaft of the power take-off.

4. An adapter to cooperate with the power pad and take-off of an engine to drive an auxiliary mechanism having a projecting splined shaft, said take-off including an engine driven hollow shaft provided with internal splines and an oil duct terminating adjoining the outer end of said shaft, comprising a housing having a chamber therein, means communicating with the outer end of the oil duct of the take-off whereby to maintain the chamber approximately filled with oil, a driving shaft mounted in said housing to traverse said chamber and project beyond one side of the housing for insertion in the take-off shaft, external splines on the projecting end of said driving shaft for cooperation with the internal splines of the take-off shaft, a parallel driven shaft mounted in said housing to traverse said chamber and pass through the opposite side of the housing, said driven shaft being hollow at the end thereof passing through the side of the housing for the reception of the shaft of the auxiliary mechanism, internal splines in the hollow end of the driven shaft for cooperation with the splines of the shaft of the auxiliary mechanism, and a pair of meshed gears contained within the chamber of the housing, one thereof being fixed to each of said driving and driven shafts.

5. The combination with a power source and an auxiliary driven mechanism, of a unitary adapter interposed therebetween for the transfer of power from the source to the driven mechanism comprising a unitary hollow housing having a bearing extending through the closed side thereof and a second bearing extending partly through said closed side, said power source and housing having complemental recesses in the corresponding faces thereof, a relatively flat, thin plate seated in the aforesaid recesses and having bearings therein in alignment with the bearings of the housing, a shaft operating in one set of bearings and passing through the closed side of the housing and having driving means of connection between the outer end thereof and the auxiliary driven mechanism, a second shaft in another set of aligned bearings projecting beyond the outer surface of said plate, driving means of connection between the projecting end of said second shaft and the power source, and meshing gears affixed to said shafts.

6. A power transfer adaptor to support and drive an auxiliary mechanism from a power source comprising a hollow housing having means on the open face thereof for attachment to the power source and corresponding means on the opposite face thereof for attachment and support of the auxiliary mechanism, a bearing through the closed face of said housing and a second bearing extending partially therethrough, a plate supported between said housing and power source having bearings therein in alignment with the aforesaid bearings, shafts operating in the said aligned sets of bearings, one of which extends through the closed side of said housing and operatively engages said auxiliary mechanism and the other of which extends through said plate and operatively engages said power source, and coupling means situated within the housing for mechanically interconnecting the shafts aforesaid.

7. The combination with a power source, of a takeoff mechanism comprising a hollow housing having an open face surrounded by means for mounting said housing in cooperation with the power source, a bearing extending through the closed side of said housing and a second bearing extending partially therethrough, bearings associated with the power source in alignment with the bearings of the housing aforesaid, a shaft supported by one set of bearings and extending through the closed side of said housing for driving an auxiliary mechanism, a second shaft supported by the second set of bearings, means of connection between the last said shaft and the power source, and means for coupling the aforesaid shafts.

8. A power takeoff mechanism for operatively coupling a power absorbing device to a power source comprising a housing having a recess in one face thereof and means adjoining said recessed face for the attachment of the housing to the power source, a plurality of bearings in the closed side of the housing one of said bearings extending therethrough, a corresponding set of bearings in association with the power source, driving and driven shafts operatively supported by the bearings aforesaid, said driven shaft extending through the housing for operative engagement with the power absorbing device, means operatively coupling said driving shaft with the power source, meshing gears affixed to and coupling said shafts, and an oil duct in the power source communicating with the recess of said housing.

9. The combination with an engine having a power pad and take off, of a housing having an open recess at one side and a series of bearings in the closed side thereof, a shaft mounted in each of said bearings and traversing the recess in the housing, means engaged between the power pad and the recessed side of said housing in opposition to the closed side thereof to support said shafts, means for connecting one of said shafts to the take off, means for connecting the other of said shafts to an auxiliary mechanism associated with the closed side of the housing, and a driving connection with the housing between said shafts.

10. An adapter to drive an auxiliary mechanism from the power pad and take-off of an engine, said power pad and take-off having a driving shaft and an open oil duct connected with the lubricating system of the engine, comprising a hollow housing adapted to sealingly engage with the outer face of the engine power pad and take-off, means of communication between the interior of the housing and the oil duct of said power pad and take-off whereby oil from the duct and the engine lubricating system fills the housing, and power transmission means within the housing operating in the oil bath in the housing and adapted to be connected on one side of the housing to the driving shaft of the power pad and take-off and on the opposite side to an auxiliary mechanism.

11. An adapter to drive an auxiliary mechanism from the power pad and take-off of an engine, said power pad and take-off including a driving shaft and an oil duct, comprising a hollow housing, means for sealingly mounting said housing on the outer face of said power pad and take-off, a conduit through a housing wall communicating at one of its ends with the interior of the housing and at the other of its ends with the oil duct of the power pad and take-off whereby the interior of the housing fills with oil from said oil duct, and power transmission means within the housing including means on one side of the housing for connection with the driving shaft of the power pad and take-off and means on the other side of the housing for connection with an auxiliary mechanism.

12. An adapter for association with an engine power pad and take-off having a driving shaft and oil duct, and adapted to drive an auxiliary mechanism from said driving shaft, comprising a hollow housing open upon one of its sides, a plate attached to said housing to sealingly close the open side thereof and adapted to be mounted in flush and sealing cooperation with the face of said power pad and take-off, said plate being provided with at least one passage communicating at its ends with the oil duct of the power pad or take-off and the interior of the housing whereby the latter may become filled with oil, power transmission means situated within the housing and operating in the oil therein contained, means for connecting said transmission means on one side of the housing with the driving shaft of the power pad and take-off, and means for connecting said transmission means on the other side of the housing with an auxiliary mechanism.

WILLIAM A. BOHANNON.

REFERENCES CITED

The following references are of record in the file of this patent:

UNITED STATES PATENTS

| Number | Name | Date |
| --- | --- | --- |
| 1,462,675 | Whittington | July 24, 1923 |
| 1,815,161 | Owens | July 21, 1931 |
| 1,872,924 | Galanot | Aug. 23, 1932 |
| 2,164,670 | Thomas | July 4, 1939 |
| 2,214,170 | Le Tourneau | Sept. 10, 1940 |
| 2,284,251 | Ball et al. | May 26, 1942 |
| 2,288,425 | Simborg | June 30, 1942 |
| 2,289,396 | Waseige | July 14, 1942 |